United States Patent
Capps, Jr. et al.

(10) Patent No.: US 6,665,782 B2
(45) Date of Patent: Dec. 16, 2003

(54) METHOD AND APPARATUS FOR PREVENTING UNAUTHORIZED ACCESS OF MEMORY DEVICES

(75) Inventors: Louis Bennie Capps, Jr., Georgetown, TX (US); Scott Leonard Daniels, Cedar Park, TX (US); Danny Marvin Neal, Round Rock, TX (US); Yat Hung Ng, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 240 days.

(21) Appl. No.: 09/931,430

(22) Filed: Aug. 16, 2001

(65) Prior Publication Data

US 2003/0037212 A1 Feb. 20, 2003

(51) Int. Cl.[7] .............................................. G06F 12/00
(52) U.S. Cl. ........................................ 711/163; 711/115
(58) Field of Search ................................. 711/163, 115

(56) References Cited

U.S. PATENT DOCUMENTS

| | | | | |
|---|---|---|---|---|
| 5,091,938 A | * | 2/1992 | Thompson et al. | 380/239 |
| 5,166,976 A | * | 11/1992 | Thompson et al. | 380/225 |
| 5,185,794 A | * | 2/1993 | Thompson et al. | 380/235 |
| 5,267,312 A | * | 11/1993 | Thompson et al. | 380/237 |
| 5,406,627 A | * | 4/1995 | Thompson et al. | 380/237 |
| 5,703,658 A | * | 12/1997 | Tsuru et al. | 348/554 |
| 5,998,858 A | | 12/1999 | Little et al. | 257/678 |
| 6,065,679 A | | 5/2000 | Levie et al. | 235/462.47 |
| 6,122,716 A | | 9/2000 | Combs | 711/163 |

FOREIGN PATENT DOCUMENTS

WO    WO 200293332 A1 * 11/2002 ............. G06F/1/00

* cited by examiner

*Primary Examiner*—Kevin Verbrugge
(74) *Attorney, Agent, or Firm*—Synnestvedt & Lechner LLP; Mark McBurney

(57) ABSTRACT

A method and apparatus for preventing unauthorized access to data stored in memory utilizing two programmable logic devices as front end interfaces for the memory device and the data processing device which is to utilize the memory device, respectively. The two programmable logic devices are complementary programmed such that the signal lines between the data processing device and the memory core and/or their timing are scrambled at the interface between the two programmable logic devices, but are properly ordered with the proper timing at the interface between the memory core and the first programmable logic device and the interface between the data processing device and the second programmable logic device.

32 Claims, 3 Drawing Sheets

METHOD AND APPARATUS FOR PREVENTING UNAUTHORIZED ACCESS OF MEMORY DEVICES

FIELD OF THE INVENTION

The invention pertains to the protection of data stored in digital memory from unauthorized access. The invention is particularly adapted for use in connection with removable non-volatile memory devices such as flash memories and digital film cards.

BACKGROUND OF THE INVENTION

With the proliferation of small, light-weight portable digital devices, such as digital cameras, mp3 players/recorders, digital video cameras, personal digital assistants and other palmtop computing devices, the use of high density, non-volatile, removable memory devices has increased dramatically. Of course, hard disk drives such as those found in personal video recorders, desktop computers and notebook computers, also are high density, non-volatile, digital memories, for storing large volumes of data.

It is often the case that individuals wish to provide enhanced security from unauthorized access for stored data stored in such memory devices. Accordingly, methods and apparatus are known for providing enhanced security. Such methods and apparatus include the use of passwords to gain access to memory devices or portions of memory (e.g., files or directories). Also known are software based encryption systems where the actual bits of the data are stored in memory in a scrambled manner and can only be unscrambled by use of the appropriate encryption key.

U.S. Pat. No. 6,122,716, assigned to the same assignee as the present application, discloses a system and method for authenticating a computer memory having a memory control circuit that scrambles some of the bus lines, thereby scrambling the data in the memory on reset and unscrambles the bus lines responsive to inputs from a lock control circuit. A lock control circuit monitors the bus, waiting for a proper combination of bus values to be asserted onto the bus, at which time the lock control circuit causes the memory control circuit to unscramble the bus lines.

All of the aforementioned schemes are primarily, if not exclusively, software based. It would be useful to have a fully hardware implemented scheme for securing data in memory.

Accordingly, it is an object of the present invention to provide a hardware based method and apparatus for preventing unauthorized access of data stored on a memory.

It is a further object of the present invention to provide an improved method and apparatus for preventing unauthorized access of data stored in memory.

SUMMARY OF THE INVENTION

The invention is applicable to any digital storage medium, such as hard disks, zip drive disks, read only memory (ROM) integrated circuits, but is particularly suitable in connection with removable integrated circuit memories, such as flash memories and digital film cards. In accordance with the invention, the memory device comprises a memory core and a programmable logic circuit, such as a programmable array logic (PAL) circuit, interposed between the memory core and the external terminals (e.g., pins) of the device. The programmable logic circuit preferably is integral with the memory core on a single integrated circuit. A second programmable logic circuit is associated with the data processing device that uses that memory device. The two programmable logic circuits are programmable by the purchaser so that the purchaser can selectively set any external pin of the memory device to couple to any internal memory core signal path such that any chip signal can be assigned to any external pin. The purchaser can program both PALs in a complementary fashion such that the signals have a non-standard, scrambled pin assignment at the physical interface between the memory device and the data processing device, but are descrambled by the two complementary programmed programmable logic circuits at the interface between the programmable logic circuits and the memory core and actual data processing circuitry in the data processing device respectively.

In this manner, the memory device cannot be used with any data processing device that is not equipped with a PAL that is complementarily programmed relative to the PAL of the memory device. Therefore, one having possession of the memory device, but not the data processing device having the complementarily programmed system-side PAL would not be able to read the data out of the memory properly.

DETAILED DESCRIPTION OF THE INVENTION

Figure 1:
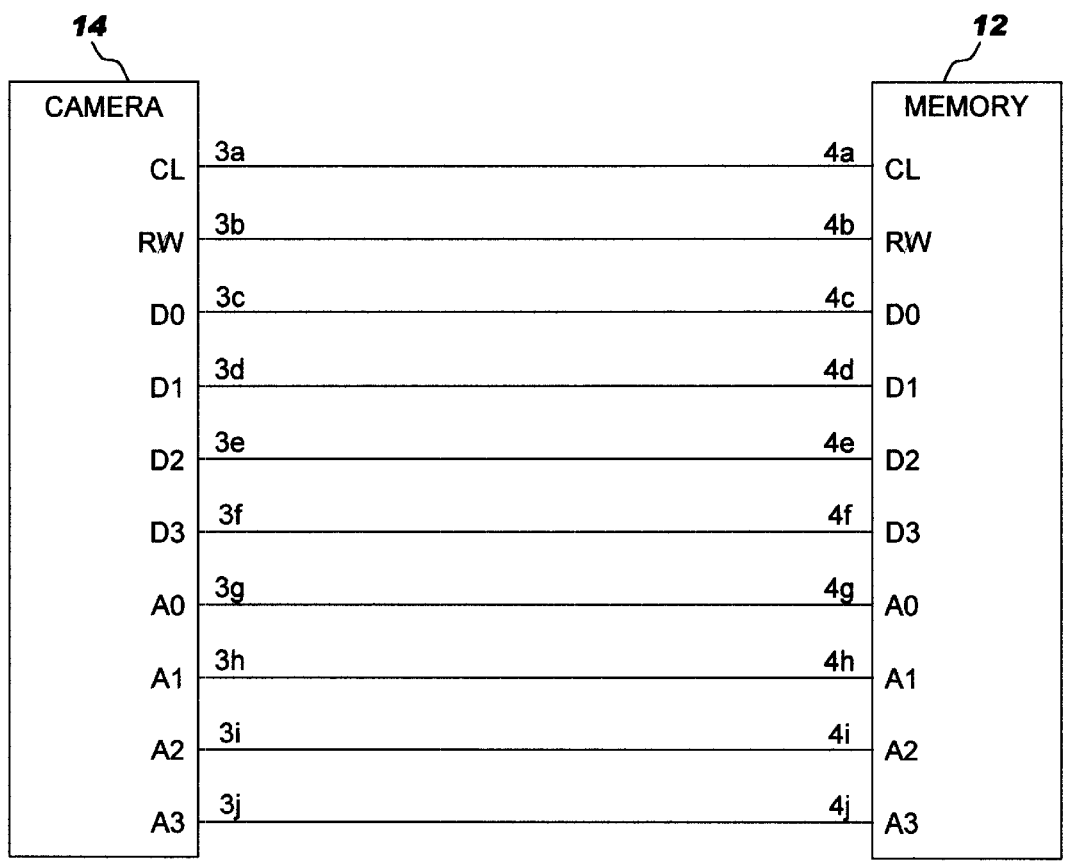
FIG. 1 is a schematic diagram illustrating an interface between the terminals of a memory device and a corresponding data processing device in accordance with the prior art.

FIG. 1 schematically illustrates an exemplary set of pin assignments for an interface between a removable memory device 12, and the data processing device 14 to which it is to be coupled. For exemplary purposes, let us assume that the memory device 12 is a flash memory for use in storing digital photographs and that the data processing device 14 is a digital camera adapted to pluggably accept flash memory cards as a removable storage media. The signals path to and from a memory device typically include at least the following:

(1) a data bus for reading and writing the data (FIG. 1 illustrates a 4-bit wide parallel data bus comprising signal lines, $D_0$–$D_3$);

(2) a read/write control line, R/W, to indicate whether a read or a write operation is to occur;

(3) an address bus for selecting the memory locations from which data is to be written or read (FIG. 1 illustrates a 4-bit wide address bus comprising signal lines $A_0$–$A_3$); and (4) a clock signal line, CL.

It will be understood by those of skill in the art that most modern high density memories have additional control signals and much wider address and data busses. However, FIG. 1 illustrates only a minimal number of signals in order not to obfuscate the invention.

Of course, memory devices are designed in a standard manner such that each signal appears at a particular external connector 4 of the memory device. Likewise, the digital camera is adapted to physically mate to the flash memory such that the external terminals 4 of the memory mate with corresponding external terminals 3 of the camera so that the data, address and control signals can be properly exchanged between the digital camera and the memory device. In order to simplify terminology in this specification, we shall call the external terminals of the memory device "pins" and the mating external terminals of the data processing device "slots". However, it will be understood by those of skill in the art that the invention is applicable to devices using any type of external connectors. Obviously, the pin on the memory device that corresponds to a particular signal, e.g., the R/W control line 4b, must couple to the slot 3b on the digital camera that corresponds to that same signal. For instance, if the digital camera sends the RAW control signal to slot 3a, but, mating pin 4a of the memory device is expecting to receive the clock signal CL, the digital camera will not be able to properly write data to or read data from the memory.

Memory devices and the data processing devices that use them typically are mass-produced and have the same terminal-to-signal assignments hereinafter termed a standard interface. Accordingly, any one of the particular, mass-produced memory devices can be used in connection with any one of the particular, mass-produced data processing devices designed to use that memory device. However, it would be desirable in many cases to allow a particular memory device to be able to be used with only one or a few particular data processing devices in order to help prevent unauthorized access to confidential data stored on the memory device. This is a particular concern with respect to removable memories like film cards for digital cameras, memory cards used in MP3 players, and Zip drives. because such memory devices are small and often transported separately from the data processing device. Thus, they are easy to lose and easy to steal. Further, even when they are mounted on the corresponding data processing device, they often can be removed in a matter of seconds.

In accordance with the present invention, the memory device and the data processing device are equipped with programmable logic circuits that allow an individual to selectively reassign signals to the external terminals of the memory device (pins) and the data processing device (slots) so that the physical interface between the pin terminals of the memory device and the pin slots of the data processing device can be non-standard and unique for each different pair of memory device and corresponding data processing device. More particularly, a first programmable logic circuit is interposed between signal terminal points (e.g., external chip pins) and the memory core of a memory device. This programmable logic circuit is herein termed the "memory-side" programmable logic circuit. The data processing device that is adapted to use that memory device also includes a similar programmable logic device interposed between the external terminals (e.g., the pin slots that physically accept the pins of the memory device) and the circuitry that actually processes the data . This programmable logic circuit is herein termed the "system-side" programmable logic circuit. The two programmable logic circuits enable a purchaser of the memory device and the corresponding data processing device to selectively set the assignments of signals to external pins on the memory as well as on the data processing device. The purchaser therefore can complementarily program the two programmable logic devices such that the interfacing signals between the data processing device and the memory device are non-standard at the physical interface between the two devices. However, the signals are unscrambled by the respective programmable logic circuits at the interfaces between the programmable logic circuits and the memory core or data processing circuitry, respectively.

The two complementary programmable logic devices provide an entirely hardware-based means of scrambling the signal lines at the external terminals of the memory device so that the memory device cannot be used except with the data processing device having the complementarily programmed programmable logic device.

The system-side and memory-side programmable logic devices can be comprised of any circuitry that allows one to selectively set a path between one set of terminals and another set of terminals, such as a programmable array logic (PAL) circuit or a field programmable logic array (FPGA). Existing PAL and FPGA circuit designs as well as custom designed programmable logic circuits, can readily be adapted for use in accordance with the present invention. With respect to memory devices in which the memory core is a semiconductor (i.e., an integrated circuit chip), the programmable logic circuit associated with the memory preferably is integrated directly on the same chip as the memory core and is electrically positioned between the pins and the memory core. A PAL, for instance, essentially comprises a collection of combinational logic gates, such as AND-gates and OR-gates, that can be programmably intercoupled to produce various combinational logic circuits. A PAL can be programmed to simply route signals between signal paths in the memory core and any particular external pin connector without affecting the integrity or value of the signals. FPGAs also are readily programmable to serve the same function.

Of course, such programmable logic circuit also can be used to form more complex combinational logic circuits that do change the values and/or relative timing of the signals passing therethrough. Therefore, it is within the scope of the present invention, to use the programmable logic circuits to not only direct the signals from the memory core to the pins in unique patterns, but also to change the timing of signals relative to each other such that signal timing at the physical interface between the pins of the memory device and slots of the data processing device is altered from its original condition, but is correct when it reaches the memory core and the data processing circuitry of the data processing device, respectively.

With respect to the data processing device, the programmable logic device may be integrated on an integrated circuit already in the device or may be a separate integrated circuit. Further, in either type of embodiment, the integrated circuit can be a socket mount type circuit (pluggable) or a solder mounted circuit. It is envisioned that, whether or not the programmable logic circuit is easily removable will have little practical effect on the level of security provided. Particularly, the IC comprising the system-side programmable logic circuit likely will be mounted internally in the data processing device. Therefore, regardless of whether it is a socket mount integrated circuit or a solder mount circuit, one wishing to remove the programmable logic circuit for purposes of gaining unauthorized access to a memory device would need access to the inside of the data processing device. Anyone with sufficient time to open the device to remove the integrated circuit comprising the programmable logic circuit most likely has sufficient time and inclination to remove the chip even if it is solder mounted.

With respect to the memory device, preferably the programmable logic device is on the same integrated circuit chip as the memory core. However, in situations where the memory core is not an integrated circuit, such as hard drives and Zip drives, or for some other reason cannot be formed on the same integrated circuit chip as the memory core, the programmable logic circuit should be physically coupled to the memory core so that it cannot be removed without destroying the memory core or at least the ability to read and write data to the memory core. Obviously, if the programmable logic circuitry can be removed leaving the memory core intact, the purpose of the invention is entirely defeated in that, without the programmable logic circuitry, the signal lines would be accessible in their standard, unscrambled form.

It can be seen that the scrambling scheme in accordance with the present invention is entirely hardware-based and requires no change to the design of the memory core circuitry or the processing circuitry of the data processing device. It simply requires the addition of one programmable logic circuit to the memory device and another programmable logic circuit to the data processing device. A very small number of gates or other programmable logic is necessary to provide the ability to switch signal paths in the programmable logic device. Accordingly, the invention can be implemented with minimal additional circuit area requirements on an integrated chip.

Figure 2:
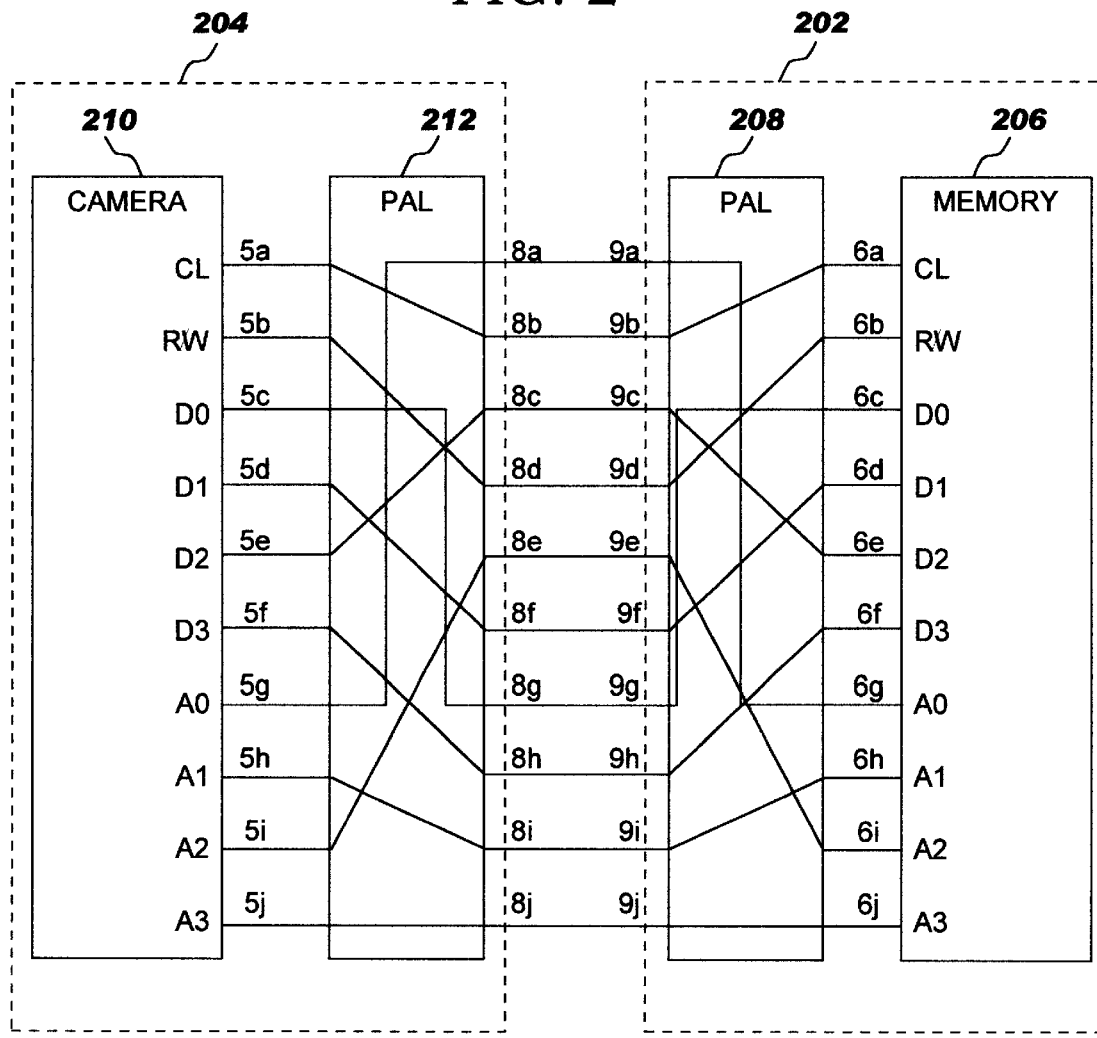
FIG. 2 is a schematic diagram illustrating an interface between the terminals of a memory device and a corresponding data processing device in accordance with the present invention.

FIG. 2 schematically illustrates the present invention. In accordance with the invention, the memory device 202 comprises two circuit portions, namely, a memory core 206 and a programmable logic circuit portion 208. The programmable logic circuit portion 208 is electrically coupled between the memory core portion 206 and the external terminals 9. Likewise the data processing device 204 comprises at least two portions, namely, the processing circuitry 210 and a programmable logic circuit portion 212. Processing circuitry 210 processes data, including data obtained from or to be sent to the memory device 202. The programmable logic circuit portion 212 is electrically coupled between the processing circuitry portion 210 and the external terminals 8. FIG. 2 illustrates an exemplary set of signal paths through the memory-side PAL 208 and a complementary set of signal paths through the system-side PAL 212. While FIG. 2 shows only lines in the PALs 208 and 212, it should be understood that the paths illustrated by the lines are actually formed of programmable circuitry, such as combinational logic gates.

It would be extremely difficult to determine the pin assignments of a memory device incorporating the present invention. For instance, in a memory device having 12 pins, the number of possible pin assignment permutations is 12! (twelve factorial) or 479,001,600. With 20 pins, the number of possible pin assignment permutations is greater than $2.43 \times 10^{18}$. Typically, the only way for an unauthorized person to determine the scrambling scheme would be through an extremely expensive, time-consuming and destructive, transistor-level reverse engineering of one of the PAL circuits.

If the scrambling scheme is compromised, one can reprogram the PALs with a different scrambling scheme.

While the invention has heretofore been described primarily in connection with a memory core that is integrated circuit based, the invention is just as readily useable in connection with other types of memory media such as hard disks and Zip disks. An integrated circuit embodying the programmable logic in accordance with the present invention can simply be incorporated into the device such that it cannot be removed or disabled without also destroying the core memory or at least the ability to read from it.

In some embodiments of the invention, it may be practical to utilize one-time programmable logic circuits which are programmed at the factory. Such embodiments probably would be limited to use in products in which it is uncommon for an end user to purchase memory separately from the purchase of the corresponding data processing device. For instance, personal video recorders may be such devices in that they typically are sold with an internal hard disk memory that is not normally replaced.

A pluggable system-side programmable logic circuit would be particularly suitable for embodiments in which the programmable logic circuits are only one time programmable. In such applications, one may simply replace the system side programmable logic circuit if and when a memory device is replaced and or has become compromised.

However, in a more preferred embodiment of the invention, the programmable logic circuitry is reprogrammable at will by the purchaser. Of course, both the memory-side and system-side programmable logic circuits must be programmed in tandem so that the signal paths through them are complementary. In one embodiment of the invention, the data processing device 14 includes processing capabilities for conveniently enabling the end user to interface with both programmable logic circuits and program them simultaneously in tandem through operation of the data processing device. For instance, if the data processing device were a palmtop computer, the palmtop computer would simply be equipped with software that allows the end user to program or reprogram the programmable logic circuits simultaneously when the memory device is plugged in to the data precessing device.

In a preferred embodiment of the invention, the end user does not actually choose the particular terminal assignment scheme. Rather, the program randomly generates terminal assignments and programs the combinational logic circuits with complementary signal paths in accordance with that scheme. It is envisioned that, in most embodiments, there will be no need for the end user to have any knowledge of the actual pin assignments since it is only necessary that the system-side and memory-side programmable logic circuits are programmed complementarily.

Figure 3:
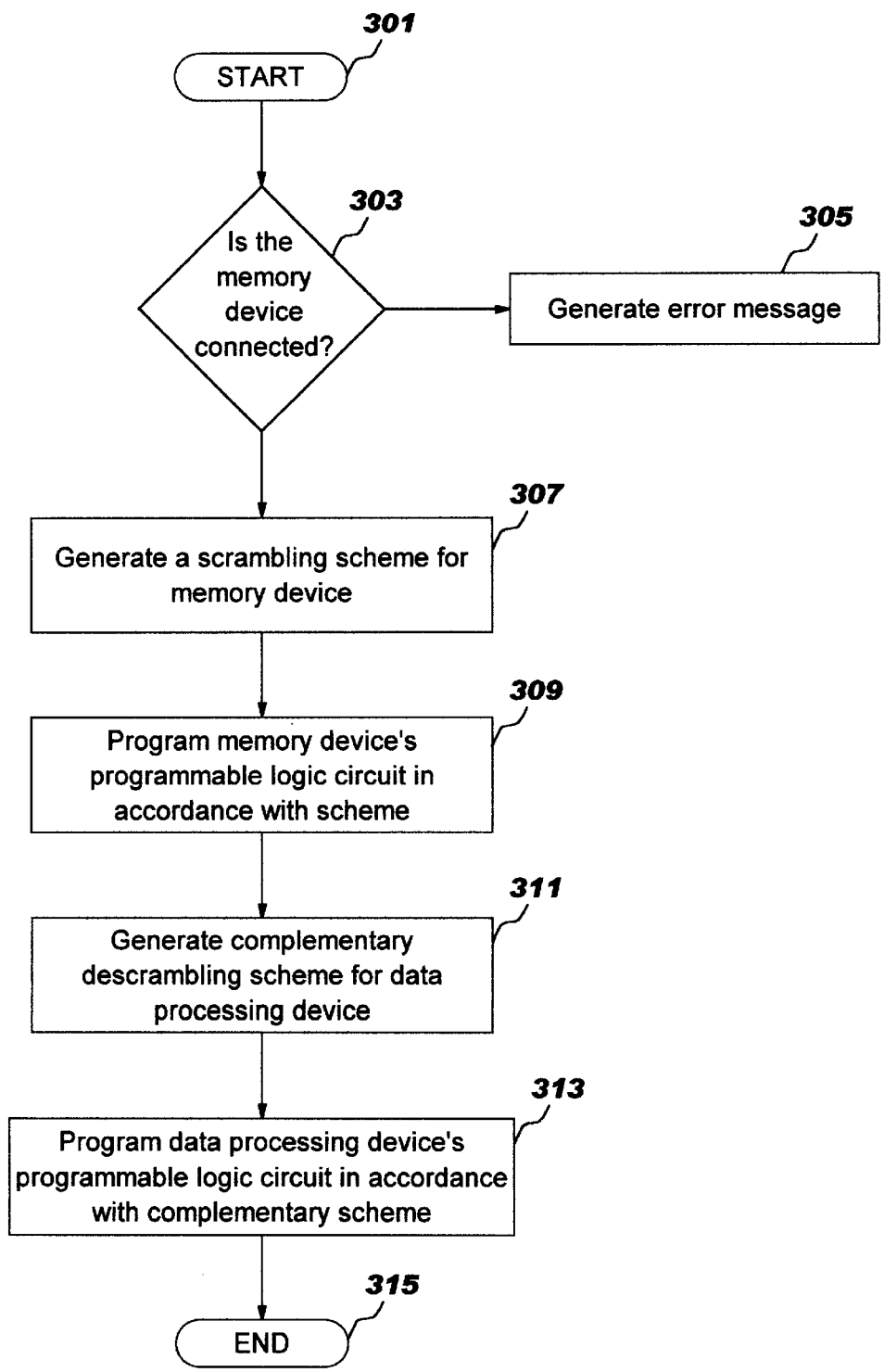
FIG. 3 is a flow diagram illustrating a routine in accordance with one exemplary embodiment of the present invention.

FIG. 3 is a flow diagram of an exemplary software procedure that may be incorporated in the data processing device for carrying out the technique of the present invention. This diagram is merely exemplary and many other potential embodiments are well within the scope of the skilled artisan in accordance with the invention as disclosed in this specification. The process starts at step 301 when, for instance, a user presses a particular button or otherwise indicates that he or she wishes to scramble the lines and/or timing at the physical interface between the memory device and the data processing device to create a new non-standard interface. Thus, in step 303, the routine first checks to assure that the memory device is properly installed in the data processing device so that both of the programmable logic circuits can be programmed complementarity and at the same time. If the memory device is not installed, then it issues an error message (step 305) to the user proceeds directly to the end of the routine and does not perform the operation. The error message can take any reasonable form, such as text on a display screen, if the data processing device has a display screen.

If the memory is properly installed, in step 307 a scrambling scheme is generated for the memory device. In step 309, the programmable logic circuit of the memory device is programmed in accordance with that scheme. In steps 311 and 313, the device develops the complementary scrambling scheme (step 311) and programs the programmable logic circuit of the data processing device accordingly (step 313). The procedure ends at step 315.

It is envisioned that providers of memory devices will offer two versions of the memory device, namely one with the programmable logic circuits in accordance with the present invention and one without them. Accordingly, purchasers can decide whether they need the extra security provided by the present invention. In such cases, the data processing device also could be sold in two version. However, more preferably, the data processing device always includes programmable logic circuitry in accordance with the present invention, but the programmable logic circuitry is programmed to a default condition that is complementary to the original pin assignments of the memory devices that are not equipped with the present invention. Preferably, even the memory devices that are equipped with the present invention are programmed to a default condition that is identical to the pin assignment scheme of the memory devices that do not incorporate the present invention.

The invention can be used in conjunction with other security schemes, especially software-based schemes, such as encryption keys. The invention can be implemented with any standard memory core available and does not require any changes whatsoever to the memory core circuitry, yet is a fully hardware implemented security scheme.

Further, the complementary programmable logic circuits may be programmed to dynamically change the scrambled lines at predetermined intervals, e.g., every 100 clock cycles. For instance, in such embodiments, the two programmable logic circuits can be programmed to include a state machine that dynamically alters the signal paths and/or timing in unison at designated intervals. In a preferred embodiment, the dynamic reprogramming would occur only when the memory device is plugged into the data processing device. Such an embodiment would increase security at least by virtue of the fact that the programmable logic circuitry would be more complicated and thus would be even more difficult to reverse engineer or be otherwise compromised than the static embodiments discussed above.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

We claim:

1. A secure digital memory device comprising:
   a memory unit comprising a plurality of memory locations and a plurality of signal paths for conveying signals to and from said memory unit;
   a plurality of signal terminals for coupling said signal paths of said memory unit to circuitry external to said device; and
   a programmable logic circuit coupled between said signal terminals and said signal paths, said programmable logic circuit programmable such that at least one of (1) the terminals to which said signal paths are coupled, (2) the relative timing of signals at said signal terminals and (3) the values of said signals at said signal terminals is altered;
   wherein said digital memory device is one of a digital film card, a flash memory and a DASD and said processing device is one of a digital camera, an MP3 player/recorder, a palm top computing device, and a digital video camera.

2. The device of claim 1 wherein said memory unit and said programmable logic circuit are integrally formed on an integrated circuit chip.

3. The device of claim 1 wherein said programmable logic circuit comprises a programmable array logic circuit.

4. The device of claim 1 wherein said programmable logic circuit comprises a field programmable logic array.

5. The device of claim 1 wherein said device is adapted for removable coupling, to a data processing device at said signal terminals.

6. The device of claim 1 wherein said programmable logic circuit is reprogrammable.

7. A system for coupling a memory device to a data processing device so that said data processing device can communicate with said memory device, said memory device comprising:
   a memory core comprising a plurality of memory locations and a first plurality of signal paths for communicating signals between said memory core and said data processing device;
   a first plurality of signal terminals for coupling said first plurality of signal paths to said data processing device at an interface;
   a first programmable logic circuit coupled between said first signal terminals and said first signal paths and adapted to permit programming of the connection of the signal terminals of said first plurality of signal terminals to the signal paths of said first plurality of signal paths; and
   said data processing device comprising:
   data processing circuitry including a second plurality of signal paths corresponding to said first plurality of signal paths; and
   a second plurality of signal terminals adapted to couple said second plurality of signal paths to said memory device at said interface; and
   a second programmable logic circuit coupled between said second plurality of signal paths and said second plurality of signal terminals, said second programmable logic device adapted to permit programming of the connection of said signal terminals of said second plurality of signal terminals to said signal paths of said second plurality of signal paths;
   wherein said first and second programmable logic circuits can be programmed complementarily so that said interface is non-standard, yet said signals are communicated between signal paths of said first plurality of signal paths and said corresponding signal paths of said second plurality of signal paths without alteration.

8. The system of claim 7 wherein said first and second programmable logic circuits are programmed complementarily so that said interface is non-standard, yet said signals are communicated between signal paths of said first plurality of signal paths and said corresponding signal paths of said second plurality of signal paths without alteration.

9. The system of claim 7 wherein an assignment of said signals to said first and second signal terminals is non-standard.

10. The system of claim 7 wherein the relative timing of said signals at said first and second signal terminals is non-standard.

11. The system of claim 7 wherein the values of signals at said first and second signal terminals are non-standard.

12. The system of claim 7 wherein said data processing device further comprises means for complementarily programming said first and second programmable logic circuits.

13. The system of claim 12 wherein said first and second programmable logic devices are programmable more than once.

14. The system of claim 7 wherein said memory device and said first programmable logic circuit are integrally formed on an integrated circuit chip.

15. The system of claim 7 wherein said first and second programmable logic circuits comprise programmable array logic circuits.

16. The system of claim 7 wherein said first and second programmable logic circuits comprise field programmable logic arrays.

17. The system of claim 9 wherein said interface comprises a pluggable interface.

18. The system of claim 9 wherein said second programmable logic circuit is pluggable with said data processing circuit.

19. The system of claim 18 wherein said integrated circuit is one of a digital film card, a flash memory and a DASD and said data processing device is one of a digital camera, an MP3 player/recorder, a palm top computing device, and a digital video camera.

20. A method of preventing unauthorized access of a memory device adapted to interface to a data processing device, said memory device having a memory core and a first plurality of signal paths for conveying signals between said memory core and said data processing device and a first plurality of signal terminals for coupling to said data processing device, said data processing device having data processing circuitry including a second plurality of signal paths corresponding to said first plurality of signal paths and a second plurality of signal terminals adapted to physically couple to said first plurality of signal terminals of said memory device at an interface, said method comprising the steps of:

provideing a first programmable logic circuit between said first signal terminals and said first signal paths of said memory device and adapted to permit programming of the connection of the signal terminals of said first plurality of signal terminals to said signal paths of said first plurality of signal paths;

providing a second programmable logic circuit between said second plurality of signal paths and said second plurality of signal terminals of said data processing device, each terminal of said second plurality of signal terminals corresponding to one of said signal paths, said second programmable logic device adapted to permit programming of the connection of the signal terminals of said second plurality of signal terminals to said signal paths of said second plurality of signal paths; and programming said first and second programmable logic circuits complementarily so that said interface is non-standard, yet said signals are communicated between said signal paths and said corresponding signal paths of said second plurality of signal paths without alteration.

21. The method of claim 20 wherein the relative timing of said signals to said first and second signal terminals is non-standard.

22. The method of claim 20 wherein the relative timing of said signals at said first and second signal terminals is non-standard.

23. The method of claim 20 wherein the values of signals at said first and second signal terminals is non-standard.

24. The method of claim 20 further comprising the step of:
reprogramming said first and second programmable logic devices so as to change said interface.

25. The method of claim 23 wherein said programming step is performed by an end user of said memory device and data processing device.

26. The method of claim 25 wherein said programming step comprises:
responsive to said end user manually issuing an instruction to perform said programming step, said data processing device programs said first and second programmable logic circuits automatically, whereby said end user is unaware of the scheme of the non-standard interface.

27. A computer program product in a computer readable medium for preventing unauthorized access of a memory device adapted to interface to a data processing device, said memory device having a memory core with a first plurality of signal paths for conveying signals between said memory core and said data processing device, a first plurality of signal terminals for interfacing to said data processing device at an interface and a first programmable logic circuit between said first signal terminals and said first signal paths, said data processing device having data processing circuitry including a second plurality of signal paths corresponding to said first plurality of signal paths, a second plurality of signal terminals adapted to be coupled to said first plurality of signal terminals of said memory device at said interface and a second programmable logic circuit between said second plurality of signal paths and said second plurality of signal terminals, said computer program product comprising:

first instructions for programming said first programmable logic circuit so as to couple individual signal paths of said first plurality of signal paths to individual signal terminals of said first plurality of signal terminals through said first programmable logic circuit so that signals at said interface are non-standard; and second instructions for programming said second programmable logic circuit so as to couple individual signal paths of said second plurality of signal paths to individual signal terminals of said second plurality of signal terminals through said second programmable logic circuit in a complementary scheme relative to said first programmable logic circuit, whereby said interface is nonstandard, yet said signals are communicated between said signal paths of said first plurality of signal paths and said corresponding signal paths of said second plurality of signal paths without alteration.

28. The computer program product of claim 27 wherein an assignment of said signals to said first and second signal terminals is non-standard.

29. The computer program product of claim 27 wherein the relative timing of said signals at said first and second signal terminals is non-standard.

30. The computer program product of claim 27 wherein the values of signals at said first and second signal terminals are nonstandard.

31. The computer program product of claim 27 further comprising:
third instructions for randomly generating a non-standard interface scheme, and wherein said first and second instructions program said first and second programmable logic circuits in accordance with said scheme.

32. The computer program product of claim 31 further comprising:
fourth instructions for detecting an input from a user requesting programming of said first and second programmable logic circuits, and wherein said first, second, and third instructions are executed responsive to said detection.

* * * * *